United States Patent

[11] 3,634,884

[72] Inventor Vernon B. Ross
 Pasadena, Calif.
[21] Appl. No. 15,753
[22] Filed Mar. 2, 1970
[45] Patented Jan. 11, 1972
[73] Assignee Larson Industries, Incorporated
 Pasadena, Calif.

[54] MOTION DETECTION SYSTEM
 4 Claims, 1 Drawing Fig.
[52] U.S. Cl. ..................................... 340/258 A,
 340/258 R
[51] Int. Cl. ........................................ G08b 13/00
[50] Field of Search ............................... 340/258,
 258 A, 26 T, 15.5, 258 B; 343/5 PD; 325/8

[56] References Cited
 UNITED STATES PATENTS
R25,100 12/1961 Chapin ........................ 340/258
3,261,009 7/1966 Stetten et al. ................. 340/261

3,187,234 1/1965 Muranaka et al. ............. 340/213 CX
Primary Examiner—John W. Caldwell
Assistant Examiner—Michael Slobasky
Attorney—Harris, Kiech, Russell & Kern ABSTRACT: A system for detecting human movement within a "protected" area comprising an ultrahigh frequency transmitter coupled to an antenna for continuously radiating electromagnetic waves of a sinusoidal waveform and for receiving such electromagnetic waves as are reflected from objects within the protected area. The transmitted and reflected waves are continuously algebraically summed and demodulated to produce a fluctuating direct current signal which in turn is filtered, amplified and amplitude detected to produce an alarm condition indicating signal only if an object is moving within the protected area and presents an "effective" signal-reflective area at least equivalent to a human. The alarm condition indicating signal is then monitored for repetitions indicative of human movement which if occurring activate an alarm or other support system.

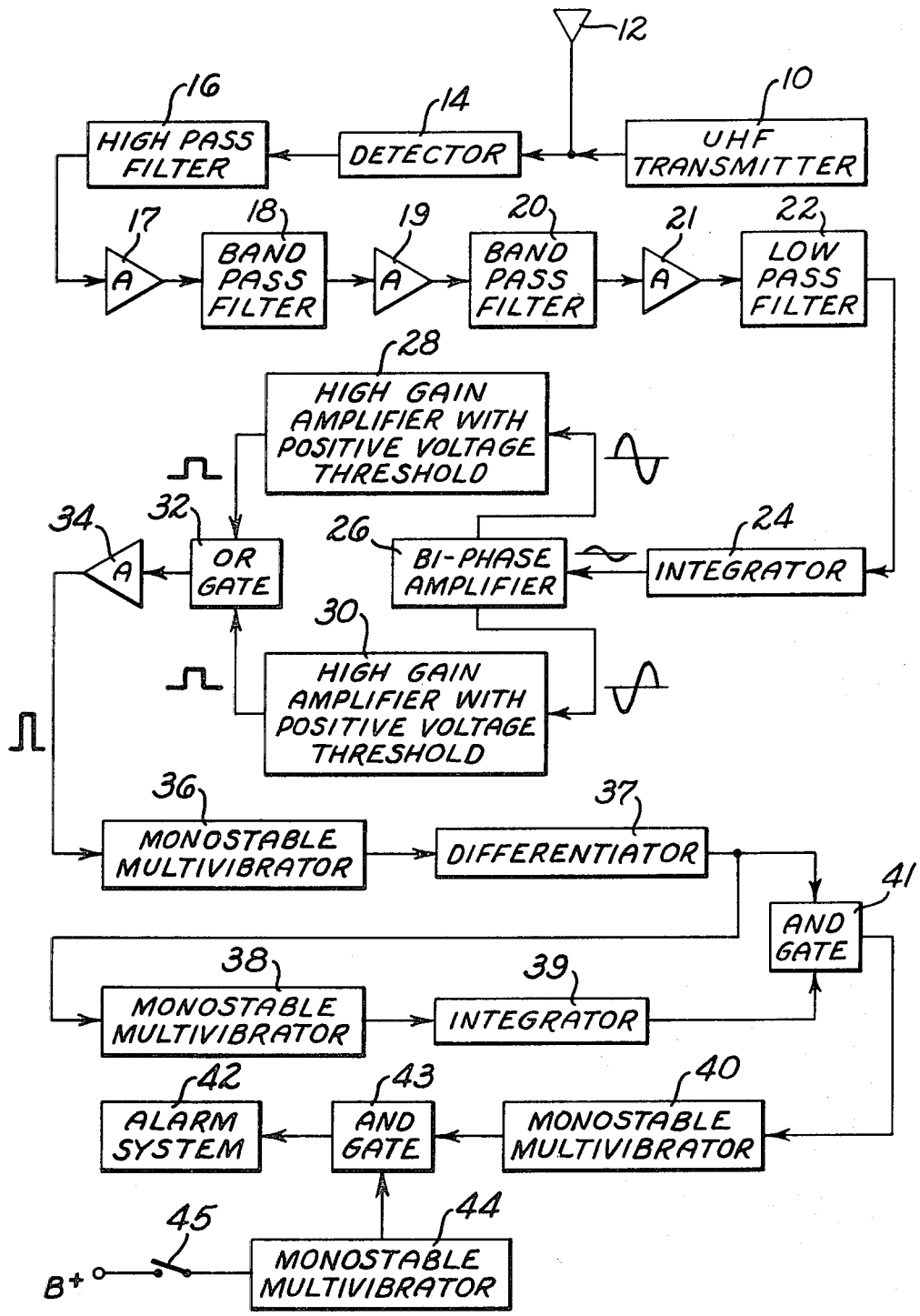

MOTION DETECTION SYSTEM

The present invention relates to a system for detecting moving objects and, more specifically, with a motion detection system which is particularly suited to the detection of human intruders within "protected" areas such as office buildings, industrial plants, warehouses, and the like.

Most motion detection systems and particularly those presently employed as surveillance systems for office buildings, industrial plants, warehouses, banks, and the like, function on the Doppler principle, that is, frequency differences between generated and reflected electrical signals are monitored to detect movement of objects within the area protected by the system. In practice, such systems are plagued by false alarms despite the introduction of filtering networks and the use of signal-isolation techniques. Moreover, as such networks are added to the Doppler-type systems, they become extremely complex and consequently expensive to implement and maintain.

In view of the foregoing, it is an object of the present invention to provide a relatively simple, inexpensive, false-alarm-free motion detection system which is particularly useful as a security system for office buildings, industrial plants, warehouses, and the like.

Another object of the present invention is to provide a system of the foregoing character in which ultrahigh frequency electromagnetic waves of sinusoidal waveform are continuously generated, reflected, algebraically summed and detected to produce a fluctuating direct current signal, changes in the magnitude of which are indicative of motion of objects within an area protected by the system.

A further object of the present invention is to provide a system of the foregoing character wherein the fluctuating direct current signal is amplified and filtered of all components caused by environmental changes, transients, and the like.

Still another object of the present invention is to provide a system of the foregoing nature wherein the filtered and amplified signal is continuously monitored for magnitudes above a predetermined threshold to generate alarm condition indicating signals indicative of movement of objects within the protected area presenting an "effective" signal reflective area at least equivalent to a human.

A still further object of the present invention is to provide a system of the foregoing nature wherein false alarms are avoided by monitoring the alarm condition indicating signals for repetitions indicative of human movement before generating an alarm-actuating signal.

The foregoing as well as other objects and advantages of the present invention may be more clearly understood by reference to the following detailed description when considered with the drawing which illustrates in block diagram form one embodiment of a motion detection system incorporating the features of the present invention.

Generally speaking, the motion-detecting system illustrated in the drawing includes a UHF transmitter 10 for continuously generating a UHF signal of sinusoidal waveform. An antenna 12 is connected to the output of the transmitter 10 and is driven thereby to radiate electromagnetic waves of sinusoidal waveform such that they saturate an area to be protected by the system. For example, the antenna may be mounted adjacent the ceiling of a room and generate electromagnetic waves which fill the room. The waves radiating from the antenna strike objects within the room and are reflected back and received at the antenna. The reflected waves received at the antenna develop ultrahigh frequency signals of the same frequency as those generated by the transmitter. Of course, due to attenuation of the electromagnetic waves as they radiate from the antenna and are reflected from objects within the room, the amplitude of the reflected signals is less than that of the transmitted signals.

The transmitted and reflected ultrahigh frequency signals are combined algebraically on a continuous basis to form a third ultrahigh frequency signal at the input of a detector 14 coupled to the antenna. The detector 14 demodulates the third signal to produce a fluctuating direct current signal.

The fluctuating direct current signal is applied to a receiver comprising a plurality of filter and amplifier stages (filters 16, 18, 20, and 22 and amplifiers 17, 19, and 21). In the receiver, the fluctuating direct current signal is converted to a low-frequency alternating current signal which is amplified and filtered of extraneous high- and low-frequency signal components such as those caused by changes in environmental conditions in the room, circuit parameter changes, electrical transients produced by machinery in the room, fluorescent light operation, reflections from rotating machinery and the like.

The alternating current signal thus amplified and filtered by the receiver is next detected for amplitudes in excess of predetermined values. This is accomplished in a threshold detector comprising by way of example the integrator 24, biphase amplifier 26, high-gain amplifiers with positive voltage thresholds 28 and 30, OR-gate 32 and amplifier 34. The thresholds set by the amplifiers 28 and 30 represent the minimum amplitude of a signal which would be produced upon movement of an object within the room having an effective signal-reflective area at least equivalent to a human (when the system is employed as a security system). That is, the object must at least reflect as much wave energy back to the antenna as would a human moving in the protected area. Upon detection of amplitude peaks in excess of the threshold, the threshold detector develops an alarm condition indicating signal which is fed to a logic board (here monostable multivibrators 36, 38, and 40, differentiator 37, integrator 39, and AND-gate 41).

The function of the logic board is to assure that an alarm or other indication is only provided when the alarm condition indicating signal developed by the threshold detector is actually produced by movement of a human within the room. This is accomplished by the logic board's receiving a first alarm condition indicating signal and the effect waiting for a predetermined time or monitoring for an additional alarm condition indicating signal or signals, the generation and receipt of which is indicative of random movement characteristic of a human within the room. Only after receipt of such an additional alarm condition indicating signal or signals is an alarm-actuating signal developed in the logic board to trigger an alarm or other support system 42. If an additional alarm condition indicating signal is not received at the logic board during the predetermined period of time, the logic board resets itself and awaits initial operation by a subsequent alarm condition indicating signal.

The motion-detecting system of the present invention further provides for an override of the system upon its being placed in a motion-detecting state as when the room is being locked for the evening. This function is provided by the AND-gate 43, monostable multivibrator 44, normally open switch 45 and power supply or source B+.

From the foregoing brief description, it should be appreciated that the system of the present invention is relatively simple in structure and principle of operation and is protected by the filtering network, threshold detector and logic board from undesired false alarm conditions.

Referring now more specifically to the preferred form of the motion-detecting system illustrated in the drawing, the UHF transmitter 10 may comprise a Colpitts oscillator coupled to a class C amplifier for driving the antenna 12. The antenna may be slightly larger than a quarter wavelength and the combination designed to continuously transmit and radiate electrical signals and electromagnetic waves of a sinusoidal nature. The waves saturate the room housing the antenna and are reflected off objects in the room to return as attenuated electrical signals of the same frequency as the transmitted signals. The continuous algebraic summation of the transmitted and reflected electrical signal occurs at the input of a diode detector comprising the detector 14.

The fluctuating direct current signal developed upon operation of the detector first passes through the high-frequency pass filter 16 which filters out unwanted low-frequency components such as those produced by gradual changes in environmental conditions in the room and develops at its output a low-frequency alternating current signal. The alternating current signal is then amplified by the amplifier 17 and fed to the band-pass filter 18 which in addition to further filtering out undesired low-frequency components, filters out undesired high-frequency components as previously described. The amplifying and filtering of the alternating current signal is repeated in the amplifiers 19 and 21, and filters 20 and 22. In each case, the filters and amplifiers may be of conventional design and the amplifiers may have a variable gain such that the effective range of the motion detection system may be adjusted.

As previously indicated, the output from the low-pass filter 22 is an alternating current signal free from frequency components caused by changes in environmental conditions within the room or normal changes in the circuitry comprising the system as well as high-frequency components such as those produced by transients, the operation of fluorescent lights, rotating machinery and the like.

The alternating current signal thus filtered and amplified is applied to the input of the threshold detector. Generally speaking, the threshold detector produced an output signal, previously referred to as the alarm condition indicating signal, when and only when the amplitude of the alternating current signal exceeds a predetermined amplitude indicative of movement in the room of an object presenting an effective reflective area at least as large as a human. In its preferred form, the threshold detector plays an extremely important role in the motion detection system of the present invention since it provides the system with a very high degree of sensitivity to movement of humans within the protected area. To accomplish this, the illustrated threshold detector comprises the integrator 24 for receiving the alternating current signal. The alternating current signal possesses a relatively broad bandwidth and the integrator 24 in effect acts as a low-pass filter blocking high-frequency components and developing at its output a relatively low-frequency alternating current signal as illustrated. The output of the integrator is applied to the biphase amplifier 25 which produces two output signals, one in phase with the input signal and one 180° out of phase with the input signal. The biphase amplifier may be considered as being an amplifier and inverter combination.

The inphase output signal of the biphase amplifier 26 is fed to the high-gain amplifier with a positive voltage threshold 28 while the 180° out-of-phase output signal of the biphase amplifier is applied to the high-gain amplifier with a positive voltage threshold 30. The high-gain amplifiers which may comprise Schmitt trigger circuits, are conductive to produce output pulse signals only if the input signals applied thereto exceed the predetermined threshold voltage of operation set thereby. In the present invention, the voltage thresholds are preset to be indicative of the minimum voltage which would be produced at the inputs of the amplifiers by movement of a human within the protected area. Thus, the high-gain amplifiers 28 and 30 effectively monitor the input signals applied thereto for amplitudes indicative of human movement within the protected area. Any signal amplitude in excess of the threshold produces an output signal which is applied to the OR-gate 32 and amplified by the amplifier 34. This produces a relatively high-magnitude pulse signal which functions as an alarm condition indicating signal in the motion-detecting system.

As a practical matter, the threshold detecting of the 180° out-of-phase alternating current signals allows the system to continuously monitor positive- and negative-going fluctuations in the direct current signal produced by the detector 14 in response to motion of objects within the protected area. This means that both positive- and negative-going half-cycles of the waves reflected from a moving object are utilized for informational purposes within the motion detection system. This is important when one considers that the wavelength of the electromagnetic wave energy at about 360 megahertz is about 30 inches. If detection were only accomplished during one-half, for example, the positive-going half-cycle of such signals, then it is possible that because of the natural attenuation of such electromagnetic waves, a person could move within the protected area within a 30-inch area and his motion not produce an alarm-indicating condition within the system. By detecting both positive- and negative-going half-cycles, the system in effect detects on half-wavelength intervals or 15-inch increments. The sensitivity of the system to motion of intruders is therefore doubled over a system which detects only on positive- or negative-going half-cycles.

As previously indicated, if movement of an object having an effective reflective area corresponding to or greater than a human occurs within the protected area, the threshold detector produces a high-magnitude output signal as an alarm condition indicating signal at the output of the amplifier 34. This is applied to the logic board which operates upon the alarm condition indicating signal and awaits at least a second such signal within a predetermined time before generating an alarm signal. This has the effect of filtering out spurious signals or motions of objects of the desired size or signal-reflective areas which are not reoccurring and therefore are not characteristic of human motion. In this manner, the logic board renders the system more immune to false alarms as might be caused by falling books, containers and the like within the protected area.

To accomplish the foregoing, the logic board illustrated in the drawing comprises the three monostable multivibrators 36, 38, and 40, the differentiator 37, integrator 39, and the AND-gate 41. The first monostable multivibrator 36 responds to the alarm condition indicating signal by changing state and producing for a predetermined relatively short period of time, for example 5 seconds, a predetermined output signal such as a negative-going pulse. The negative-going pulse is differentiated by the differentiator 37 to produce first a negative-going spike followed by a positive-going spike at the end of the period of operation of the first monostable multivibrator. The output of the differentiator is connected to the AND-gate 41 and to the second monostable multivibrator 38. The second monostable multivibrator is responsive to the positive-going spike generated at the end of the period of operation of the first monostable multivibrator. In response to the positive-going spike, the second monostable multivibrator changes state to produce an output signal such as a negative-going pulse for a predetermined time duration, for example, 60 seconds. The output signal from the second multivibrator is integrated by the integrator 39 and applied to the AND-gate 41. The AND gate is designed such that it will pass a pulse to the third multivibrator 40 upon the simultaneous application to its inputs of the negative spike produced by the differentiator 37 and the negative pulse developed by the second multivibrator 38 and integrated by the integrator 39. Thus, in practice, a first alarm condition indicating signal is applied to the first multivibrator 36 to produce a negative- and then a positive-going spike at the output of the differentiator 37. The positive-going spike triggers the second multivibrator 38 to produce a negative-going pulse of 60-second time duration. If during the 60-second time duration, a second alarm condition indicating signal is generated and applied to the multivibrator 36, a negative-going spike is produced and the AND-gate 41 functions to apply pulse to the third multivibrator 40. In this manner, the logic board insures that the system is not triggered by spurious movements within the protected area but only by movements of objects of human size having human characteristics of movement.

The third multivibrator triggers upon the pulse from the AND-gate 41 to produce an alarm-actuating signal for a predetermined period of time such as 90 seconds. This time is completely sufficient for an alarm system associated with the motion detection system to be actuated. Such an alarm system is illustrated in block diagram form at 42 and may comprise a silent alarm, a communication link to a local police department, bells, lights, locks on doors and windows and the like. In addition, within the logic board, lights may be stationed at each monostable multivibrator and actuated by operation thereof to indicate the stage of operation of the logic board to an observer at a master panel.

It is a feature of the motion detection system of the present invention that all components previously described except the alarm system 42 are continuously operating and that the detection system is only set into a state capable of producing an alarm when the protected area is left unattended, as when it is locked for the night. To allow this function to occur without the authorized personnel within the building setting off the alarm as they leave, the system includes a delay mechanism connected to the normally open switch 45 and to B+ or some other source of electrical power. In the illustrated form, the delay comprises the monostable multivibrator 44 having its output connected to the AND-gate 43, the output of the third monostable multivibrator 40 also being connected to an input of the AND gate. In operation, the monostable multivibrator 44 is normally off and inactive when the switch 45 is open. When the switch is closed, a pulse is applied to its input from B+ to cause the monostable multivibrator to switch to an active state producing a signal at the input of the AND-gate 43 which blocks the AND gate for a predetermined period of time. At the end of the operating cycle of the monostable multivibrator 44, it switches to a second state and remains in that state while the switch is closed. In the second state, a signal is applied from the monostable multivibrator 44 to the AND gate which will permit the AND gate to operate and pass a pulse to the alarm system upon the occurrence of an alarm-actuating signal at the output of the third monostable multivibrator 40. The period of operation of the monostable multivibrator 44 comprising the delay system may be 3 minutes to allow adequate time for personnel in the building to leave the protected area before the alarm system 42 is in a condition wherein it will be activated by an alarm-actuating signal produced by the logic board.

From the foregoing, it should be appreciated that the present invention comprises a relatively simple motion-detecting system which is free from false alarm conditions. While a specific form of such a system has been described hereinabove, it is intended to be merely illustrative of the principles of the present invention, which is to be limited in scope only by the terms of the following claims.

I claim:

1. A system for detecting motion of objects within an area protected by said system, comprising:

a transmitter for continuously generating an ultrahigh frequency signal of sinusoidal waveform;

an antenna coupled to said transmitter for continuously generating electromagnetic waves in response to said ultrahigh frequency signals to saturate said predetermined area and for continuously receiving electromagnetic waves of like frequency reflected from objects within said predetermined area to produce a reflected ultrahigh frequency signal of sinusoidal waveform;

circuit means for continuously algebraically combining said generated and reflected ultrahigh frequency signals to form a third ultrahigh frequency signal of varying amplitude;

detector means for continuously demodulating said third ultrahigh frequency signal to produce a fluctuating direct current signal;

means connected to said detector means for filtering low- and high-frequency components from said fluctuating direct current signal and producing a low-frequency alternating current signal;

threshold means for generating an alarm condition indicating signal when the amplitude of said fluctuating direct current signal exceeds a predetermined value indicative of movement of an object in the protected area presenting at least a predetermined minimum signal-reflective area, said threshold means including means responsive to positive- and negative-going half-cycles of said alternating current signal for generating said alarm condition indicating signals when the magnitude of said alternating current exceeds a predetermined value during either said positive- or negative-going half-cycles; and means for monitoring said alarm condition indicating signals for repetitions thereof within a predetermined time interval and for developing an alarm-actuating signal in response thereto.

2. The system of claim 1 wherein said means responsive to positive- and negative-going half-cycles of said alternating current signal comprises a biphase amplifier means for developing first and second AC signals 180° out of phase with each other, high-gain amplifier means with positive predetermined voltage thresholds for receiving said first and second AC signals and for generating pulse signals when the magnitude of said first and second signals exceed said voltage thresholds, and an OR gate for receiving said pulse signals from said high-gain amplifier means for developing said alarm condition indicating signal upon receipt of a pulse from either of said high-gain amplifier means.

3. The system of claim 1 wherein said means for monitoring said alarm condition indicating signals comprises first circuit means comprising a first monostable multivibrator and a differentiator responsive to each alarm condition indicating signal for developing a first electrical signal of relatively short time duration, said circuit means comprising a second monostable multivibrator and integrator responsive to said first electrical signal for developing a second electrical signal of relatively long time duration at the termination of a first electrical signal and means responsive to a combination of said first and second electrical signals for developing said alarm-actuating signal and comprising an AND gate connected to said first monostable multivibrator and to said integrator and a third monostable multivibrator connected to an output of said AND gate.

4. The system of claim 3 including circuit means for blocking said alarm-actuating signal from actuating an alarm system comprising a second AND gate connected to an output of said third monostable multivibrator, a fourth monostable multivibrator connected to an input to said second AND gate, a power supply, a normally open switch between said power supply and an input to said fourth monostable multivibrator, said fourth monostable multivibrator having a predetermined period of operation after closing of said switch during which it blocks said second AND gate.

* * * * *